United States Patent
Ito (10) Patent No.: US 11,531,580 B2
(45) Date of Patent: Dec. 20, 2022

(54) ELECTRONIC APPARATUS EQUIPPED WITH HDD, CONTROL METHOD THEREFOR, AND STORAGE MEDIUM

(71) Applicant: CANON KABUSHIKI KAISHA, Tokyo (JP)

(72) Inventor: Nobuyasu Ito, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 181 days.

(21) Appl. No.: 16/687,798

(22) Filed: Nov. 19, 2019

(65) Prior Publication Data

US 2020/0174876 A1 Jun. 4, 2020

(30) Foreign Application Priority Data

Dec. 4, 2018 (JP) .............................. JP2018-227366

(51) Int. Cl.
*G06F 11/00* (2006.01)
*G06F 11/07* (2006.01)

(52) U.S. Cl.
CPC ...... *G06F 11/0778* (2013.01); *G06F 11/0727* (2013.01)

(58) Field of Classification Search
CPC ............. G06F 11/0778; G06F 11/0727; G06F 11/0751; G06F 11/3058; G06F 11/3062
See application file for complete search history.

(56) References Cited

U.S. PATENT DOCUMENTS 4,531,826 A * 7/1985 Stoughton .............. G03G 21/04
399/80

FOREIGN PATENT DOCUMENTS

| CN | 103648029 B | * | 9/2016 | |
| JP | 2009158626 A | * | 7/2009 | ......... G05B 19/4148 |
| JP | 2009282752 A | | 12/2009 | |

* cited by examiner

*Primary Examiner* — Katherine Lin
(74) *Attorney, Agent, or Firm* — Rossi, Kimms & McDowell LLP (57) ABSTRACT

An electronic apparatus which is capable of preventing loss of data in an HDD resulting from an instantaneous power failure. The electronic apparatus is equipped with the HDD that has a nonvolatile storage area and a volatile storage area in which data is temporarily held. A control unit executes a plurality of processes including a held data writing process in which the data held in the volatile storage area is written into the nonvolatile storage area, in a predetermined order according to an off instruction by a user. In a case where a stop of the power supply to the electronic apparatus is detected, the control unit executes the plurality of processes including the held data writing process in a different order from the predetermined order.

11 Claims, 6 Drawing Sheets

WRITING ORDER

ELECTRONIC APPARATUS EQUIPPED WITH HDD, CONTROL METHOD THEREFOR, AND STORAGE MEDIUM

BACKGROUND OF THE INVENTION

Field of the Invention

The present invention relates to an electronic apparatus, a control method therefor, and a storage medium.

Description of the Related Art

An MFP which is an electronic apparatus equipped with an HDD which is a nonvolatile recording device is known. The HDD has a volatile cache memory and a platter. When, for example, data obtained from a control unit of the MFP is to be written into the HDD, the data is temporarily stored in the cache memory, and the data stored in the cache memory is written into the platter at a predetermined time. The data written into the platter is held even after supply of power to the MFP is stopped. The writing into the platter involves mechanical operations such as a movement of a magnetic head, and hence it takes time to completely write the data into the platter. On the other hand, in the HDD, since the data obtained from the control unit is temporarily stored in the cache memory as mentioned above, the control unit can start a next process without waiting for the data to be completely written into the platter, and as a result, processing in the MFP can be speeded up.

In the MFP, when an instruction to turn off the power to the MFP is given in a state where data that has not been written into the platter is held in the cache memory (hereafter referred to as "the data holding state"), the control unit performs a predetermined shutdown sequence. Specifically, the control unit causes the MFP to enter a standby mode, and before the supply of power to the MFP is stopped, writes the data held in the cache memory into the platter. Thus, in the MFP, even when the supply of power to the MFP is stopped in response to an instruction to turn off the power, data stored in the cache memory can be held without being lost. Also, a technique to write data stored in the cache memory into the platter when power shutdown occurs in an external power supply that supplies power to the MFP has been proposed (see, for example, Japanese Laid-Open Patent Publication (Kokai) No. 2009-282752).

However, in the conventional MFP, when an instantaneous power failure occurs, if the same shutdown sequence as the one performed when the power is turned off is performed, the supply of power is stopped before a process to write data in the cache memory into the platter is completed, leading to loss of the data in the cache memory. Namely, the conventional MFP has the problem that data in the HDD is lost when an instantaneous power failure occurs.

SUMMARY OF THE INVENTION

The present invention provides an electronic apparatus and a control method therefor which are capable of preventing loss of data in an HDD resulting from an instantaneous power failure, as well as a storage medium.

Accordingly, the present invention provides an electronic apparatus comprising a storage that has a nonvolatile storage area and a volatile storage area in which data is temporarily held, a detecting unit that detects a stop of a power supply to the electronic apparatus, and a control unit that executes a plurality of processes including a held data writing process in which the data held in the volatile storage area is written into the nonvolatile storage area, in a predetermined order according to an off instruction by a user, wherein in a case where the stop of the power supply to the electronic apparatus is detected by the detection unit, the control unit executes the plurality of processes including the held data writing process in a different order from the predetermined order.

According to the present invention, loss of data in an HDD resulting from an instantaneous power failure is prevented.

Further features of the present invention will become apparent from the following description of exemplary embodiments (with reference to the attached drawings).

DESCRIPTION OF THE EMBODIMENTS

An embodiment of the present invention will now be described in detail with reference to the drawings. It should be noted that in the following description of the present embodiment, the present invention is applied to an MFP which is an electronic apparatus, but the present invention is not limited to the MFP. For example, the present invention may be applied to other apparatuses such as a printer equipped with an HDD, a scanner, a PC, and a mobile terminal.

Figure 1:
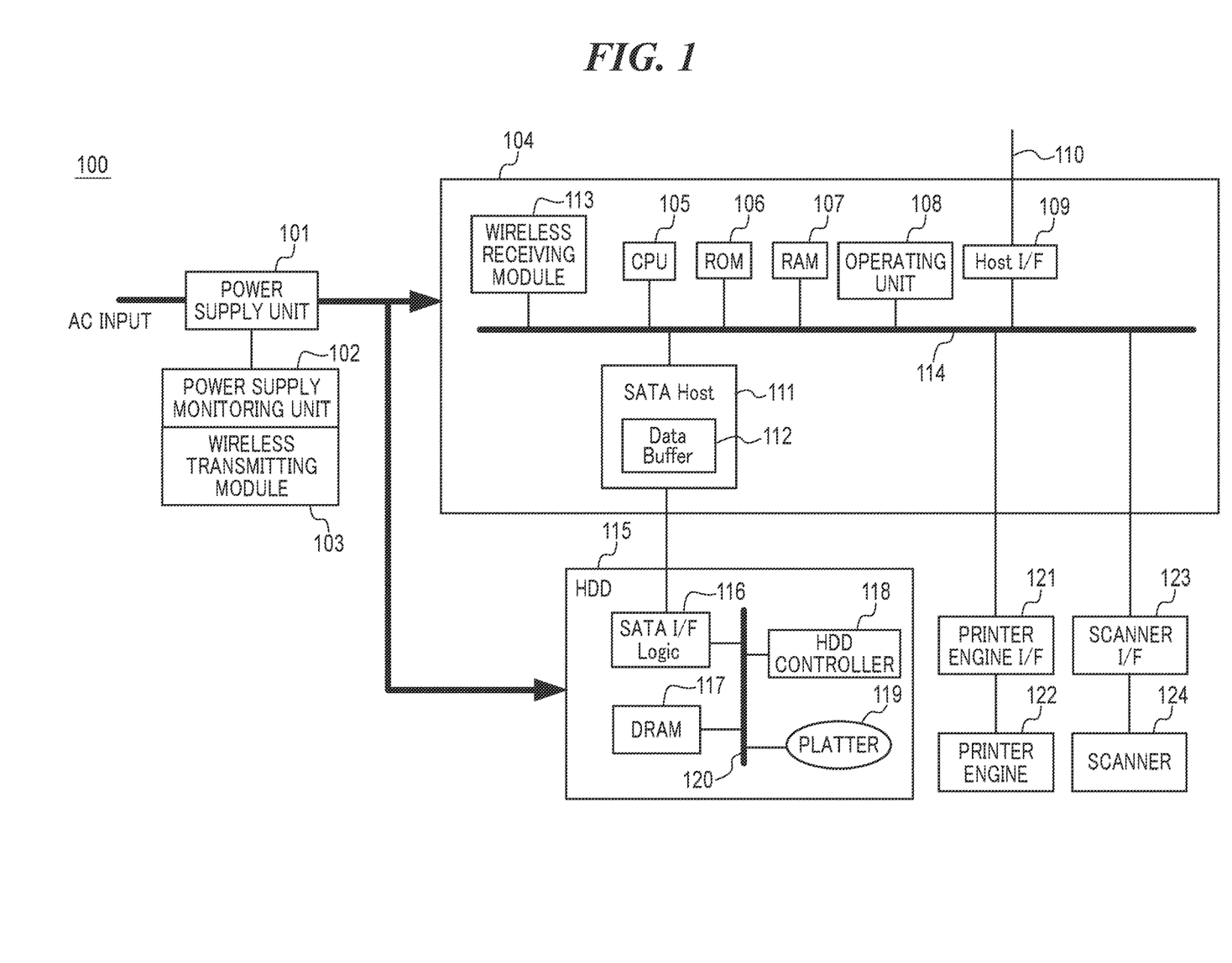
FIG. 1 is a block diagram schematically showing an arrangement of an NFP which is an electronic apparatus according to an embodiment of the present invention.

FIG. 1 is a block diagram schematically showing an arrangement of the MFP 100 which is the electronic apparatus according to the embodiment of the present invention. Referring to FIG. 1, the MFP 100 has a power supply unit 101, a power supply monitoring unit 102, a wireless transmitting module 103, a control unit 104, an HDD 115, a printer engine I/F 121, a printer engine 122, a scanner I/F 123, and a scanner 124. The power supply monitoring unit 102 is connected to the power supply unit 101 and the wireless transmitting module 103. The control unit 104 is connected to the power supply unit 101, the HDD 115, the printer engine I/F 121, and the scanner I/F 123. The printer engine 122 is connected to the printer engine I/F 121. The scanner 124 is connected to the scanner I/F 123.

The MFP 100 is an image forming apparatus which is capable of carrying out such processes as a scanning process and a printing process. The power supply unit 101 supplies power to the control unit 104 and the HDD 115 based on power supplied from an outlet (not shown) which is an AC power supply into which a power supply cord (not shown) of the MFP 100 is inserted. The power supply monitoring unit 102 monitors voltage of the power supplied from the outlet to the power supply unit 101. The wireless transmitting module 103 transmits monitoring result voltage information, which indicates a result of monitoring by the power supply monitoring unit 102, to the control unit 104.

The control unit 104 has a CPU 105, a ROM 106, a RAM 107, an operating unit 108, a host I/F 109, a SATA host 111, and a wireless receiving module 113. The CPU 105, the ROM 106, the RAM 107, the operating unit 108, the Host I/F 109, the SATA Host 111, and the wireless receiving module 113 are connected to one another via a bus 114.

The control unit 104 is a main control unit of the MFP 100. The CPU 105 is a microcomputer that controls the entire MFP 100. The ROM 106 stores control programs, setting data, and so forth for the MFP 100. The RAM 107 is used as a work memory that temporarily stores, for example, programs to be executed by the CPU 105 and data used by the CPU 105 in a computation process. The operating unit 108 is comprised of a touch panel or the like. The operating unit 108, for example, receives an instruction input by a user and also displays status information on the MFP 100 and an operating screen. The Host I/F 109 is an interface for the MFP 100 to carry out data communications with an external apparatus (not shown) via a local area network 110. The SATA host 111 has a data buffer 112. The SATA host 111 is an IC that controls the HDD 115. The data buffer 112 is a memory for data buffer in the SATA host 111. The wireless receiving module 113 receives monitoring result voltage information from the wireless transmitting module 103.

The HDD 115 has a SATA I/F logic 116, a DRAM 117 (volatile storage area), an HDD controller 118, and a platter 119 (nonvolatile storage area). The SATA I/F logic 116, the DRAM 117, the HDD controller 118, and the platter 119 are connected to one another via a bus 120. The HDD 115 is a nonvolatile storage device. The HDD 115 stores document data, software and various setting data relating to control over the MFP 100, processing data for the CPU 105, and so forth. The HDD 115 temporarily spools image processing-related data. The image processing-related data includes image data, setting data, and so forth for use in image processing. The SATA I/F logic 116 communicates with the SATA host 111. The DRAM 117 is a volatile storage device and is a cache memory in the HDD 115. When the supply of power is stopped, the DRAM 117 loses data stored therein. The HDD controller 118 is a main control unit of the HDD 115. The platter 119 is a magnetic medium of the HDD 115. Data written into the platter 119 is held even after the supply of power is stopped. In the HDD 115, when an access to the platter 119 is made, a mechanical action such as a movement of a magnetic head (not shown) of the HDD 115 occurs, and hence it takes longer time for data to be read from or written into the platter 119 than the DRAM 117 in which the above mechanical action never occurs. Upon receiving an instruction to write data from the control unit 104, the HDD 115 temporarily holds data in the DRAM 117 from and into which data can be read at higher speed than the platter 119, so as to implement a high speed data reading/writing process. For example, upon receiving an instruction to write image data from the control unit 104, the HDD 115 holds image data, which has been obtained from the control unit 104, in the DRAM 117, and after that, writes the image data held in the DRAM 117 into the platter 119 at a predetermined time. This enables the control unit 104 to start a next process without waiting for completion of data writing into the platter 119 and therefore increases the speed of processing in the MFP 100.

The printer engine I/F 121 is an I/F circuit of the printer engine 122. The printer engine I/F 121 controls data communications between the control unit 104 and the printer engine 122. The printer engine 122 prints an image on a sheet. The scanner I/F 123 is an I/F circuit of the scanner 124. The scanner I/F 123 controls data communications between the control unit 104 and the scanner 124. The scanner 124 reads a placed original and generate scanned image data.

Figure 2:
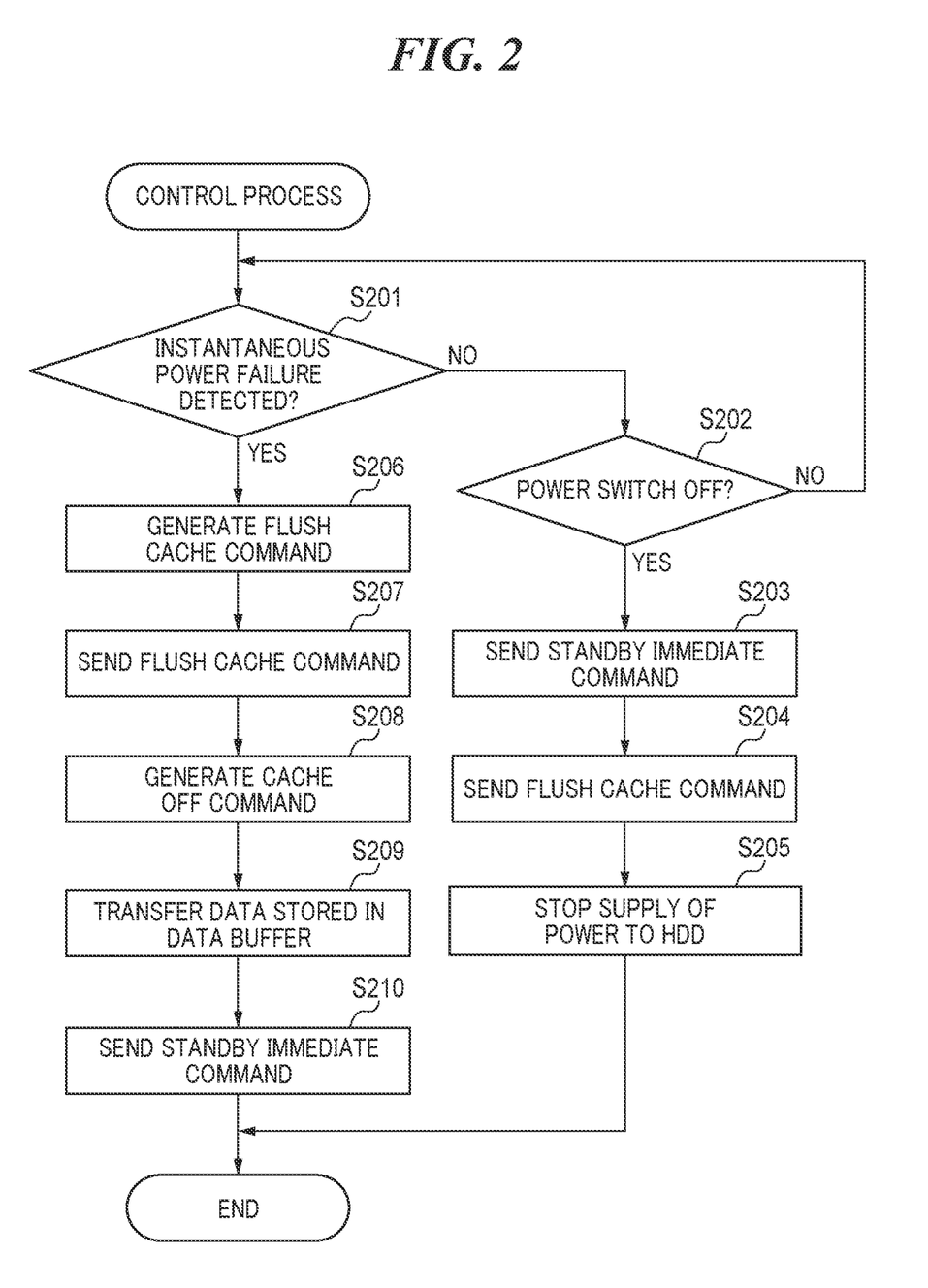
FIG. 2 is a flowchart showing the procedure of a control process which is carried out by the NFP in FIG. 1.

FIG. 2 is a flowchart showing the procedure of a control process which is carried out by the MFP 100 in FIG. 1. The process in FIG. 2 is implemented by the CPU 105 executing a program stored in the ROM 106.

Figure 3:
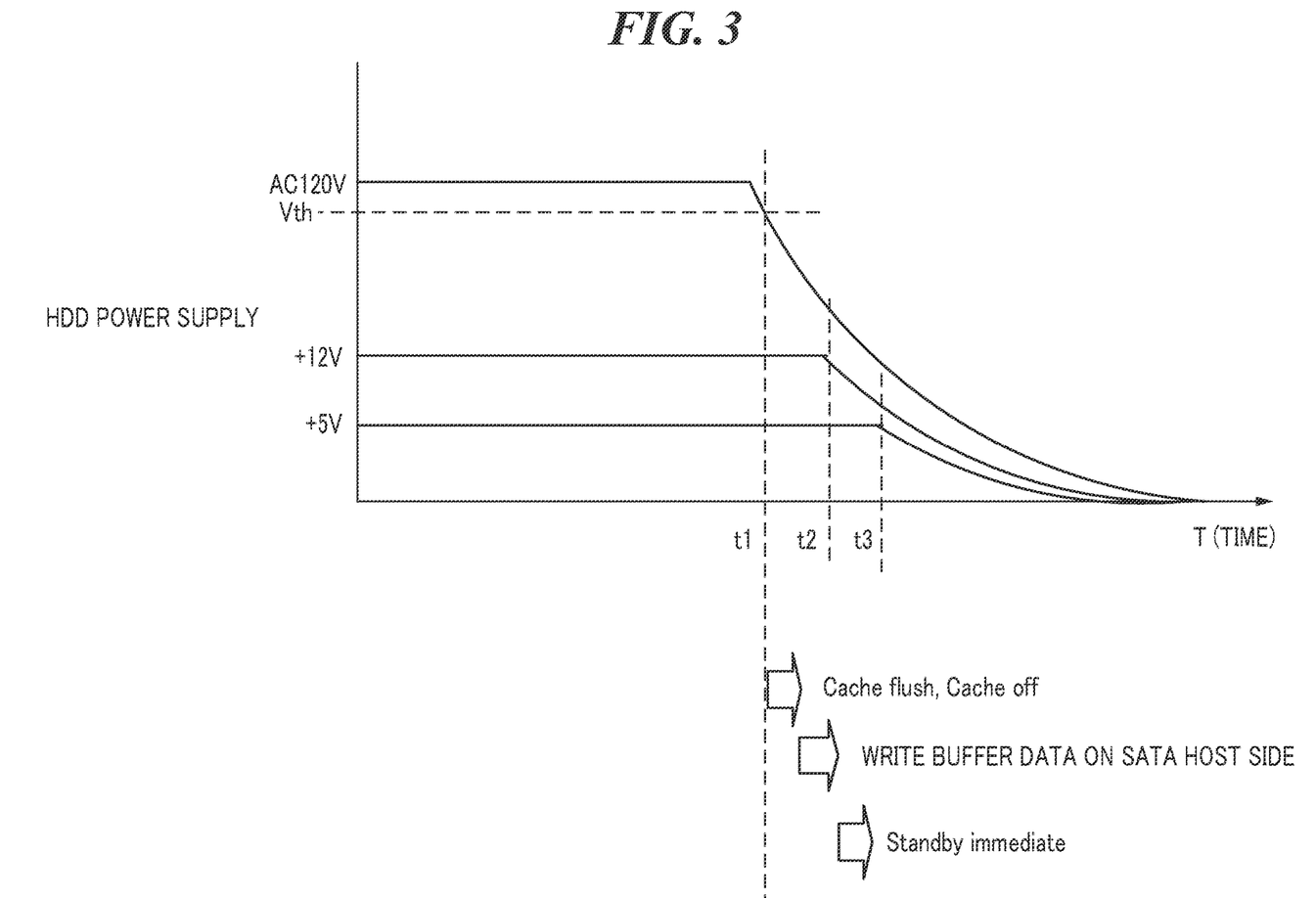
FIG. 3 is a view useful in explaining how an instantaneous power failure is detected in step S201 in FIG. 2.

Referring to FIG. 2, first, the CPU 105 determines whether or not an instantaneous power failure (a stop of a power supply to an electronic apparatus) has been detected based on monitoring result voltage information received from the wireless transmitting module 103 (step S201). In the step S201, when a voltage indicated by the monitoring result voltage information has dropped to a value equal to or smaller than a threshold value set in advance even though a power switch (not shown) of the MFP 100 is not turned off (see, for example, a time t1 in FIG. 3), the CPU 105 determines that the instantaneous power failure has been detected. On the other hand, when a voltage indicated by the monitoring result voltage information is greater than the threshold value, the CPU 105 determines that the instantaneous power failure has not been detected.

As a result of the determination in the step S201, when the instantaneous power failure has not been detected, the CPU 105 determines whether or not the power switch of the MFP 100 has been turned off (step S202).

When the CPU 105 determines in the step S202 that the power switch of the MFP 100 has not been turned off, the process returns to the step S201. As a result of the determination in the step S202, when the power switch of the MFP 100 has been turned off, the CPU 105 generates a Standby Immediate command. The Standby Immediate command is a command to carry out a standby mode shifting process that causes the MFP 100 to enter a standby mode. The CPU 105 carries out the standby mode shifting process based on the Standby Immediate command. The CPU 105 also transmits the Standby Immediate command to the HDD controller 118 via the SATA host 111 (step S203). The HDD controller 118 that has received the Standby Immediate command causes the magnetic head of the HDD 115 to retract from above the platter 119 to a predetermined area. As a result, a situation in which the power is turned off with the magnetic head staying above the platter 119 is avoided.

Next, the CPU 105 generates a Flush Cache command. The Flush Cache command is a command to carry out a held data writing process in which data held in the DRAM 117 is written into the platter 119. The data held in the DRAM 117 includes data that has not been written into the platter 119 and data that is being written into the platter 119. The CPU 105 transmits the Flush Cache command to the HDD controller 118 via the SATA host 111 (step S204). The HDD controller 118 that has received the Flush Cache command writes the data held in the DRAM 117 into the platter 119. Namely, in the present embodiment, when the power switch of the MFP 100 is turned off, the MFP 100 carries out a plurality of processes constituting a shutdown process for the MFP 100 in a predetermined order. Specifically, the MFP 100 carries out the standby mode shifting process and then the held data writing process as a shutdown process for the MFP 100. Then, the CPU 105 causes the power supply unit 101 to stop supplying power to the HDD 115 (step S205) and ends the present process.

Figure 4:
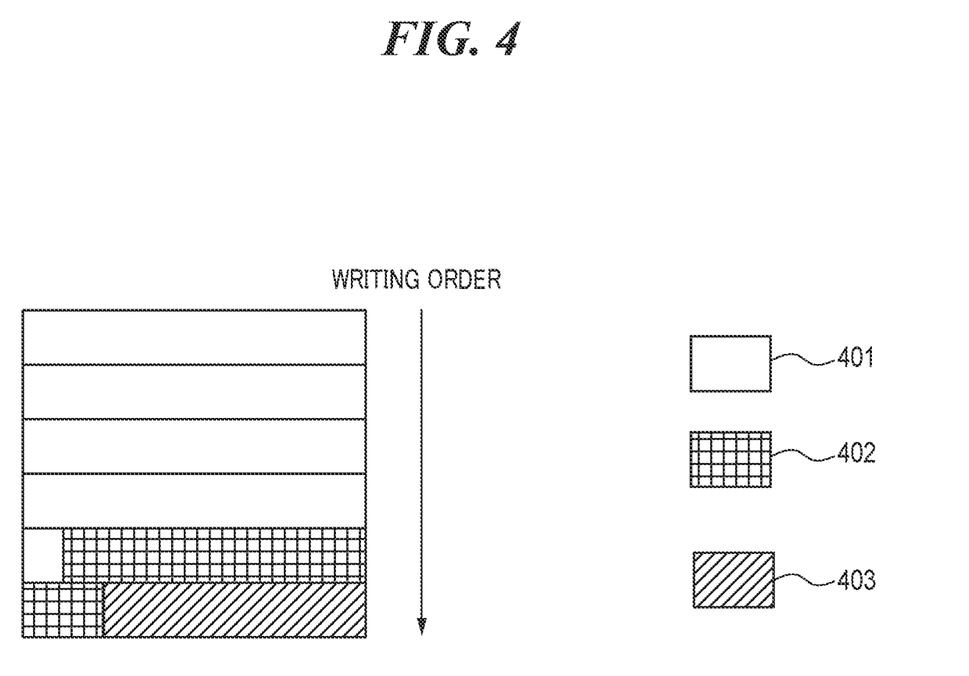
FIG. 4 is a view useful in explaining how data is written into a platter in FIG. 1.

As a result of the determination in the step S201, when the instantaneous power failure has been detected, the CPU 105 generates the Flush Cache command (step S206). Namely, in the present embodiment, when the instantaneous power failure has been detected, the MFP 100 carries out the plurality of processes constituting the shutdown process for the MFP 100 in a different order from the predetermined order. Specifically, the MFP 100 preferentially carries out the held data writing process among the plurality of processes constituting the shutdown process for the MFP 100. After that, the CPU 105 sends the Flush Cache command to the HDD controller 118 via the SATA host 111 (step S207). The HDD controller 118 that has received the Flush Cache command, for example, writes data 402, which has been held in the DRAM 117, into the platter 119 into which data 401 in FIG. 4 has already been written.

Then, the CPU 105 generates a Cache Off command (step S208). The Cache Off command is a command to switch the operating mode of the HDD controller 118 to a direct writing mode. When the operating mode of the HDD controller 118 has switched to the direct writing mode, the HDD controller 118 directly writes the data obtained from the control unit 104 into the platter 119 without holding the same in the RAM 117. Namely, in the present embodiment, when the instantaneous power failure has been detected, control is provided such that new data is not written into the DRAM 117 after the held data writing process is completed. After that, the CPU 105 sends the Cache Off command to the HDD controller 118 via the SATA host 111.

Then, the CPU 105 transfers data stored in the data buffer 112 to the HDD controller 118 (step S209). The HDD controller 118, for example, writes the received data 403 into the platter 118 into which the data 401 and the data 402 have been written. After that, the CPU 105 generates a Standby Immediate command and sends the Standby Immediate command to the HDD controller 118 via the SATA host 111 (step S210). The HDD controller 118 that has received the Standby Immediate command retracts the magnetic head of the HDD controller 118 from above the platter 119 to the predetermined area as described above. The CPU 105 then ends the present process.

According to the present embodiment, when the instantaneous power failure has been detected, the held data writing process among the plurality of processes constituting the shutdown process for the MFP 100 is preferentially carried out. Moreover, when the instantaneous power failure has been detected, the standby mode shifting process is carried out after the held data writing process is carried out. Thus, the held data writing process can be started while power is being supplied to the MFP 100, and as a result, loss of HDD data resulting from the instantaneous power failure is prevented.

Moreover, in the embodiment described above, when the instantaneous power failure has been detected, control is provided such that new data is not written into the DRAM 117 after the held data writing process is completed. As a result, a situation in which data for which writing has been instructed is lost after the held data writing process is completed is avoided.

Furthermore, in the embodiment described above, the data held in the DRAM 117 is image processing-related data for use in image processing. This prevents loss of image processing-related data resulting from the instantaneous power failure. As a result, image processing can be resumed quickly using the image processing-related data after the power is restored.

Figure 5:
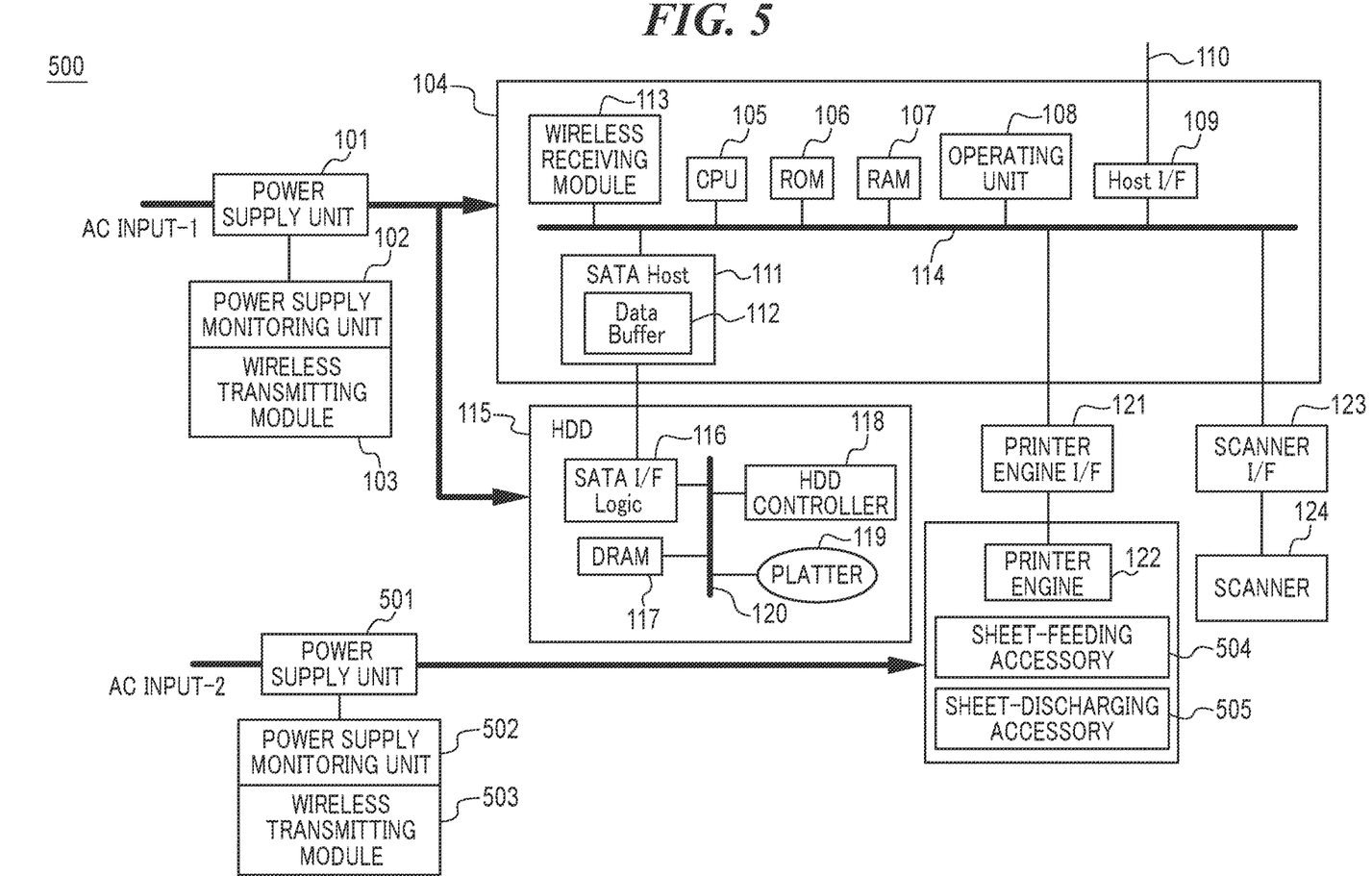
FIG. 5 is a block diagram schematically showing an arrangement of a variation of the NFP in FIG. 1.

It should be noted that power may be supplied from a plurality of outlets as with an MFP 500 in FIG. 5. In the MFP 500, when an instantaneous power failure has been detected in at least one of the plurality of outlets, the held data writing process among a plurality of processes constituting a shutdown process for the MFP 500 is preferentially carried out.

FIG. 5 is a block diagram schematically showing an arrangement of a variation of the MFP 100 in FIG. 1. Referring to FIG. 5, the MFP 500 has the components in FIG. 1 described above, and further has a power supply unit 501, a power supply monitoring unit 502, a wireless transmitting module 503, a sheet feeding accessory 504, and a sheet discharging accessory 505.

The MFP 500 is a large apparatus which is capable of high speed processing and consumes a greater amount of power than the MFP 100. The MFP 500 has a plurality of, for example, two power supply cords (not shown), which are connected to respective outlets. In the MFP 500, for example, the power supply unit 101 supplies power to the control unit 104 and the HDD 115 based on power supplied from the outlet to which one of the two power supply cords is connected. Further, the power supply unit 501 supplies power to the sheet feeding accessory 504 and the sheet discharging accessory 505 based on power supplied from the outlet to which the other one of the two power supply cords is connected. The power supply monitoring unit 502 monitors voltage of power supplied to the power supply unit 501 from the outlet to which the other one of the two power supply cords is connected. The wireless transmitting module 503 sends monitoring result voltage information, which indicates a result of monitoring by the power supply monitoring unit 502, to the control unit 104. The sheet feeding accessory 504 is comprised of a plurality of sheet-feeding cassettes and connected to the printer engine 122. The sheet discharging accessory 505 performs bookbinding, punching, folding, and so forth.

Figure 6:
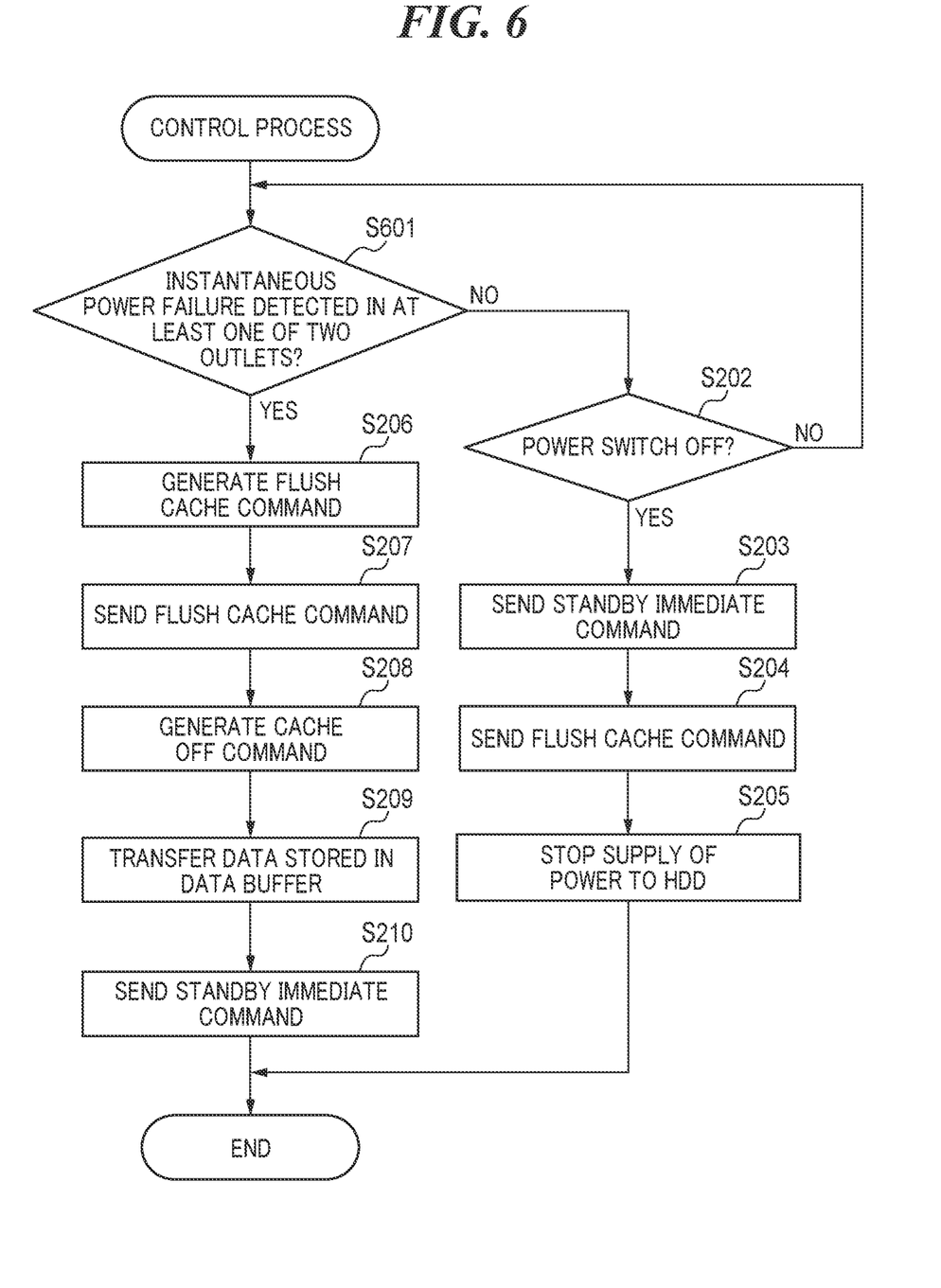
FIG. 6 is a flowchart showing the procedure of a control process which is carried out by the NFP in FIG. 5.

FIG. 6 is a flowchart showing the procedure of a control process which is carried out by the MFP 500 in FIG. 5. The process in FIG. 6 is implemented by the CPU 105 of the MFP 500 executing a program stored in the ROM 106.

Referring to FIG. 6, the CPU 105 determines whether or not an instantaneous power failure has been detected in at least one of the two outlets based on monitoring result voltage information received from the wireless transmitting module 103 and 503 (step S601).

As a result of the determination in the step S601, when the instantaneous power failure has been detected in neither of the two outlets, the CPU 105 carries out the processes in the step S202 and the subsequent steps. As a result of the determination in the step S601, when the instantaneous power failure has been detected in at least one of the two outlets, the CPU 105 carries out the processes in the step S206 and the subsequent steps.

In the embodiment described above, when the instantaneous power failure has been detected in at least one of the two outlets, the held data writing process among the plurality of processes constituting the shutdown process is preferentially carried out. As a result, the held data writing process can be started at an early stage when an abnormality of the connected two outlets is detected, and hence loss of HDD data resulting from the instantaneous power failure is prevented.

In the embodiment described above, the HDD 115 may be equipped with a battery that supplies power for a predetermined timer period after supply of power to the MFP 100 is stopped. In this case, power is supplied from the battery to the HDD 115 even after an instantaneous power failure occurs, and hence there is no immediate shortage of power in the HDD 115. For this reason, even when an instantaneous power failure occurs, a period of time during which the held data writing process is completed using the power supplied from the battery can be secured, and therefore, loss of HDD data resulting from the instantaneous power failure is prevented.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-227366, filed Dec. 4, 2018, which is hereby incorporated by reference herein in its entirety.

What is claimed is:

1. An electronic apparatus comprising:
a storage that has a nonvolatile storage area and a volatile storage area in which data is temporarily held; and
a controller configured to execute a program causing the electronic apparatus to:
in a case where an off instruction by the user is received, execute a plurality of processes including a held data writing process by which the storage writes the data held in the volatile storage area into the nonvolatile storage area in a predetermined order, after executing a standby immediate process for executing a process relating to power status of the electronic apparatus;
in a case where it is detected that a power supply to the electronic apparatus is stopped without the off instruction by the user, execute the standby immediate process after executing the plurality of processes including the held data writing process; and
in a case where it is detected that the power supply to the electronic apparatus is stopped without the off instruction by the user, after completion of the held data writing process, control the storage not to write new data into the volatile storage area.

2. The electronic apparatus according to claim 1, wherein the data held in the volatile storage area is image processing-related data for use in image processing.

3. A control method for an electronic apparatus equipped with a storage that has a nonvolatile storage area and a volatile storage area in which data is temporarily held, comprising:
in a case where an off instruction by the user is received, executing a plurality of processes including a held data writing process by which the storage writes the data held in the volatile storage area into the nonvolatile storage area in a predetermined order, after executing a standby immediate process for executing a process relating to power status of the electronic apparatus;
in a case where it is detected that the power supply to the electronic apparatus is stopped without the off instruction by the user, executing the standby immediate process after executing the plurality of processes including the held data writing process; and
in a case where it is detected that a power supply to the electronic apparatus is stopped without the off instruction by the user, after completion of the held data writing process, control the storage not to write new data into the volatile storage area.

4. The control method for the electronic apparatus according to claim 3, wherein the data held in the volatile storage area is image processing-related data for use in image processing.

5. A non-transitory computer-readable storage medium storing a program for causing a computer to execute a control method for an electronic apparatus equipped with a storage that has a nonvolatile storage area and a volatile storage area in which data is temporarily held, the control method for the electronic apparatus comprising:
in a case where an off instruction by the user is received, executing a plurality of processes including a held data writing process by which the storage writes the data held in the volatile storage area into the nonvolatile storage area in a predetermined order, after executing a standby immediate process for executing a process relating to power status of the electronic apparatus;
in a case where it is detected that a power supply to the electronic apparatus is stopped without the off instruction by the user, executing the standby immediate process after executing the plurality of processes including the held data writing process; and
in a case where it is detected that the power supply to the electronic apparatus is stopped without the off instruction by the user, after completion of the held data writing process, controlling the storage not to write new data into the volatile storage area.

6. The non-transitory computer-readable storage medium according to claim 5, wherein the data held in the volatile storage area is image processing-related data for use in image processing.

7. The electronic apparatus according to claim 1, wherein in the case where the off instruction by the user is received, the plurality of processes include a generation process of a Flush Cache command to be used for executing the held data writing process and the held data writing process based on the Flush Cache command.

8. The electronic apparatus according to claim 7, wherein in the case where it is detected that the power supply to the electronic apparatus is stopped without the off instruction by the user, the plurality of processes include the generation process of the Flush Cache command, the held data writing process, a generation process of a Cache Off command to be used for causing the storage to, when the new data is written, write it into the nonvolatile storage area but not to write it into the volatile storage area, and a transmission process of the Cache Off command to the storage.

9. The electronic apparatus according to claim 8, further comprising a data buffer configured to temporally hold data before writing data into the storage,
wherein in the case where it is detected that the power supply to the electronic apparatus is stopped without the off instruction by the user, the plurality of processes further include a data transmission process, executed after the transmission process of the Cache Off command, for transferring data held by the data buffer to the storage.

10. The electronic apparatus according to claim 9, wherein in the case where it is detected that the power supply to the electronic apparatus is stopped without the off instruction by the user, the controller executes the generation process of the Flush Cache command, the held data writing process, the generation process of the Cache Off command, the transmission process of the Cache Off command, the data transmission process, and the standby immediate process, in this order.

11. The electronic apparatus according to claim 1, wherein the standby immediate process is a process for shifting the electronic apparatus into a standby state.

* * * * *